(12) United States Patent
Mowat

(10) Patent No.: US 7,761,594 B1
(45) Date of Patent: Jul. 20, 2010

(54) METHOD AND APPARATUS FOR FORWARDING REQUESTS IN A CACHE HIERARCHY BASED ON USER-DEFINED FORWARDING RULES

(75) Inventor: J Eric Mowat, Piedmont, CA (US)

(73) Assignee: NetApp, Inc., Sunnyvale, CA (US)

( * ) Notice: Subject to any disclaimer, the term of this patent is extended or adjusted under 35 U.S.C. 154(b) by 1121 days.

(21) Appl. No.: 09/981,343

(22) Filed: Oct. 15, 2001

(51) Int. Cl.
*G06F 15/173* (2006.01)

(52) U.S. Cl. ........................ 709/238; 709/223

(58) Field of Classification Search ............... 709/207, 709/223, 238, 241, 242, 217, 226
See application file for complete search history.

(56) References Cited

U.S. PATENT DOCUMENTS

| | | | | |
|---|---|---|---|---|
| 5,928,323 A * | 7/1999 | Gosling et al. | ............ | 709/203 |
| 5,991,306 A * | 11/1999 | Burns et al. | ............ | 370/429 |
| 5,991,810 A * | 11/1999 | Shapiro et al. | ............ | 709/229 |
| 6,006,264 A * | 12/1999 | Colby et al. | ............ | 709/226 |
| 6,134,588 A * | 10/2000 | Guenthner et al. | ............ | 709/226 |
| 6,336,117 B1 * | 1/2002 | Massarani | ............ | 707/100 |
| 6,438,652 B1 * | 8/2002 | Jordan et al. | ............ | 711/120 |
| 6,542,964 B1 * | 4/2003 | Scharber | ............ | 711/122 |
| 6,754,681 B2 * | 6/2004 | Brodersen et al. | ............ | 707/202 |
| 6,772,214 B1 * | 8/2004 | McClain et al. | ............ | 709/229 |
| 6,772,225 B1 * | 8/2004 | Jennings et al. | ............ | 709/240 |
| 6,785,704 B1 * | 8/2004 | McCanne | ............ | 718/105 |
| 6,986,018 B2 * | 1/2006 | O'Rourke et al. | ............ | 711/213 |
| 7,032,031 B2 * | 4/2006 | Jungck et al. | ............ | 709/246 |
| 2003/0023698 A1 * | 1/2003 | Dieberger et al. | ............ | 709/207 |

\* cited by examiner

*Primary Examiner*—George C Neurauter, Jr.
*Assistant Examiner*—Asghar Bilgrami
(74) *Attorney, Agent, or Firm*—Perkins Coie LLP

(57) ABSTRACT

A method and apparatus for forwarding requests in a cache hierarchy based on user-defined forwarding rules are described. A proxy cache on a network provides a user interface that enables a user to define a set of forwarding rules for controlling the forwarding of content requests within a cache hierarchy. When the proxy cache receives a content request from a client and the request produces a cache miss, the proxy cache examines the rules sequentially two determine whether any of the user-defined rules applies to the request. If a rule is found to apply, the proxy cache identifies one or more forwarding destinations from the rule and determines the availability of the destinations. The proxy cache then forwards the request to an available destination according to the applicable rule.

46 Claims, 9 Drawing Sheets

METHOD AND APPARATUS FOR FORWARDING REQUESTS IN A CACHE HIERARCHY BASED ON USER-DEFINED FORWARDING RULES

FIELD OF THE INVENTION

The present invention pertains to devices which proxy requests between clients and servers and which cache content on a computer network. More particularly, the present invention relates to a method and apparatus for forwarding requests in a cache hierarchy based on user-defined forwarding rules.

BACKGROUND OF THE INVENTION

Of the many uses of the Internet, one of the more common ones is to access content on a remote server, such as a World Wide Web server. Typically, a person operates a client device to access content on a remote origin server over the Internet. The client may be, for example, a personal computer (PC) or a handheld device such as a personal digital assistant (PDA) or cellular telephone. The client often includes a software application known as a browser, which can provide this functionality. A person using the client typically operates the browser to locate and select content stored on the origin server, such as a web page or a multimedia file. In response to this user input, the browser sends a request for the content over the Internet to the origin server on which the content resides. In response, the origin server returns a response containing the requested content to the client, which outputs the content in the appropriate manner (e.g., it displays the web page or plays the audio file). The request and response may be communicated using well-known protocols, such as transmission control protocol/Internet protocol (TCP/IP) and hypertext transfer protocol (HTTP).

For a variety of reasons, it may be desirable to place a device known as a proxy logically between the client and the origin server. For example, organizations often use a proxy to provide a barrier between clients on their local area networks (LANs) and external sites on the Internet by presenting only a single network address to the external sites for all clients. A proxy normally forwards requests it receives from clients to the applicable origin server and forwards responses it receives from origin servers to the appropriate client. A proxy may provide authentication, authorization and/or accounting (AAA) operations to allow the organization to control and monitor clients' access to content. A proxy may also act as (or facilitate the use of) a firewall to prevent unauthorized access to clients by parties outside the LAN. Proxies are often used in this manner by corporations when, for example, a corporation wishes to control and restrict access by its employees to content on the Internet and to restrict access by outsiders to its internal corporate network. This mode of using a proxy is sometimes called "forward proxying".

It is also common for a proxy to operate as a cache of content that resides on origin servers; such a device may be referred to as a "proxy cache". An example of such a device is the NetCache product designed and manufactured by Network Appliance, Inc. of Sunnyvale, Calif. The main purpose of caching content is to reduce the latency associated with servicing content requests. By caching certain content locally, the proxy cache avoids the necessity of having to forward every content request over the network to the corresponding origin server and having to wait for a response. Instead, if the proxy cache receives a request for content which it has cached, it simply provides the requested content to the requesting client (subject to any required authentication and/or authorization) without involving the origin server.

Proxy caches may be used by corporations and other institutions in the forward proxying mode, as described above. Proxy caches are also commonly used by high-volume content providers to facilitate distribution of content from their origin servers to users in different countries or other geographic regions. This scenario is sometimes called "reverse proxying". As an example of reverse proxying, a content provider may maintain proxy caches in various different countries to speed up access to its content by users in those countries and to allow users in different countries to receive content in their native languages. In that scenario the content provider "pushes" content from its origin servers to its proxy caches, from which content is provided to clients upon request.

Often a proxy cache is one of a number of proxy caches distributed on the Internet in a defined logical hierarchy known as a "cache hierarchy". Typically, each proxy cache has knowledge of the other proxy caches in the cache hierarchy. Consequently, when a proxy cache receives a content request but does not have the requested content cached locally (a "cache miss"), it may forward the request to another proxy cache in the hierarchy according to a predefined forwarding scheme. Assuming a proxy cache in the hierarchy has the requested content, the latency in servicing the request generally will still be lower than if the request had to be passed all the way to the origin server.

One problem with proxy caches in the known prior art is that they provide only crude control over how requests are forwarded. A proxy cache according to the known prior art typically uses a small number of (e.g., four or five) control variables to control request forwarding. These control variables interact with each other in complex, non-intuitive ways, making it very difficult for users (e.g., network administrators) to control the manner in which the proxy cache forwards requests. As a result, there tends to be an undesirably high number of support calls to the vendor of the proxy cache when users are unable to properly configure their devices. These prior art proxy caches also provide no ability to control the sequence in which forwarding rules are applied to a request. In addition, such devices make it difficult to add functionality after deployment, because doing so normally requires adding one or more control variables, which must work in conjunction with the previously-programmed control variables. Making such a change causes testing and validation of the proxy cache to become more difficult and complex. What is needed, therefore, is a technique which overcomes these disadvantages of the prior art.

SUMMARY OF THE INVENTION

The present invention includes a method and apparatus for operating an intermediary node on a network. The method comprises receiving, at the intermediary network node, a request for content on a network, and determining, in the intermediary network node, a forwarding destination in a defined forwarding hierarchy, by applying a set of user-specified forwarding rules to the request. The request is then forwarded according to the determined forwarding destination.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for forwarding requests in a cache hierarchy based on user-defined forwarding rules are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

As described in greater detail below, a proxy cache on a network provides a user interface that enables a network administrator or other user to easily specify and/or modify a set of forwarding rules to control the forwarding of content requests within a cache hierarchy. When the proxy cache receives a request for content from a client and the request produces a cache miss, the proxy cache examines the rules sequentially to determine whether any of the user-defined rules applies to the request. If a rule is found to apply, the proxy cache identifies one or more forwarding destinations from the rule and determines the availability of such destination(s). The proxy cache then selects an available destination, if any, based on the applicable rule, and attempts to establish a connection to that destination. If a connection is successfully established, the proxy cache forwards the request to the selected destination. If no destination encoded in the rule is available, or if the proxy cache is unable to establish a connection with an available destination from the rule, the proxy cache resumes examining the remaining rules sequentially and repeats the foregoing process.

As will become more apparent from the description which follows, the described technique provides simple, powerful, and easily-extensible user control over the forwarding of application layer (layer 7 of the ISO/OSI model) requests. With the described technique, the user can clearly and easily see and control the sequence in which the rules will be applied and which rules will be executed under any given circumstances. The user can create complex conditions by listing a sequence of simple rules, since the effect of the rules is cumulative. Backup rules can be created for use when intended forwarding destinations are unavailable. Furthermore, adding additional protocol or condition filters requires no change to the cache hierarchy control unit. New rule filters have no unexpected interactions previously written rules, which simplifies the testing and validation process.

Figure 1:
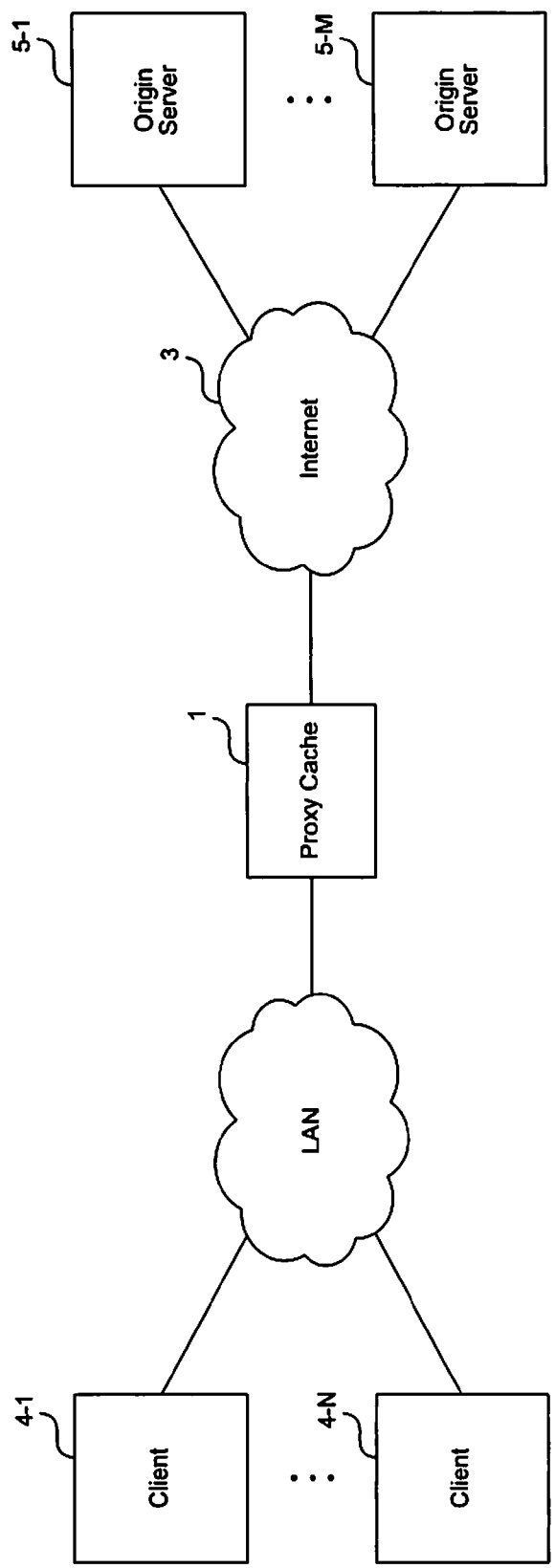
FIG. 1 illustrates a network environment in which a proxy cache according to the present invention may be implemented.

FIG. 1 illustrates a network environment in which a proxy cache according to the present invention may be implemented. As illustrated, a proxy cache 1 configured according to the present invention is connected between a LAN 2 and the Internet 3. A number (N) of clients 4-1 through 4-N are coupled to the LAN 2. A number (M) of origin servers 5-1 through 5-M are coupled to the Internet 3. The proxy cache 1 forwards requests from the clients 4 for content residing on the origin servers 5 and forwards content and/or other responses from the origin servers 5 to the appropriate clients 4. The proxy cache 1 also caches content from the origin servers 5. It may be assumed that the proxy cache 1 operates within a defined cache hierarchy.

Note that a proxy cache in accordance with the present invention can be used advantageously in network environments other than that shown in FIG. 1. For example, a proxy cache according to present invention need not be used to couple clients on a LAN to the Internet. In other embodiments, one or more other types of networks may be substituted for either the LAN 2 or the Internet 3 in the configuration of FIG. 1. Furthermore, a proxy cache may be used in either a forward proxying configuration or a reverse proxying configuration consistently with the present invention.

Figure 2:
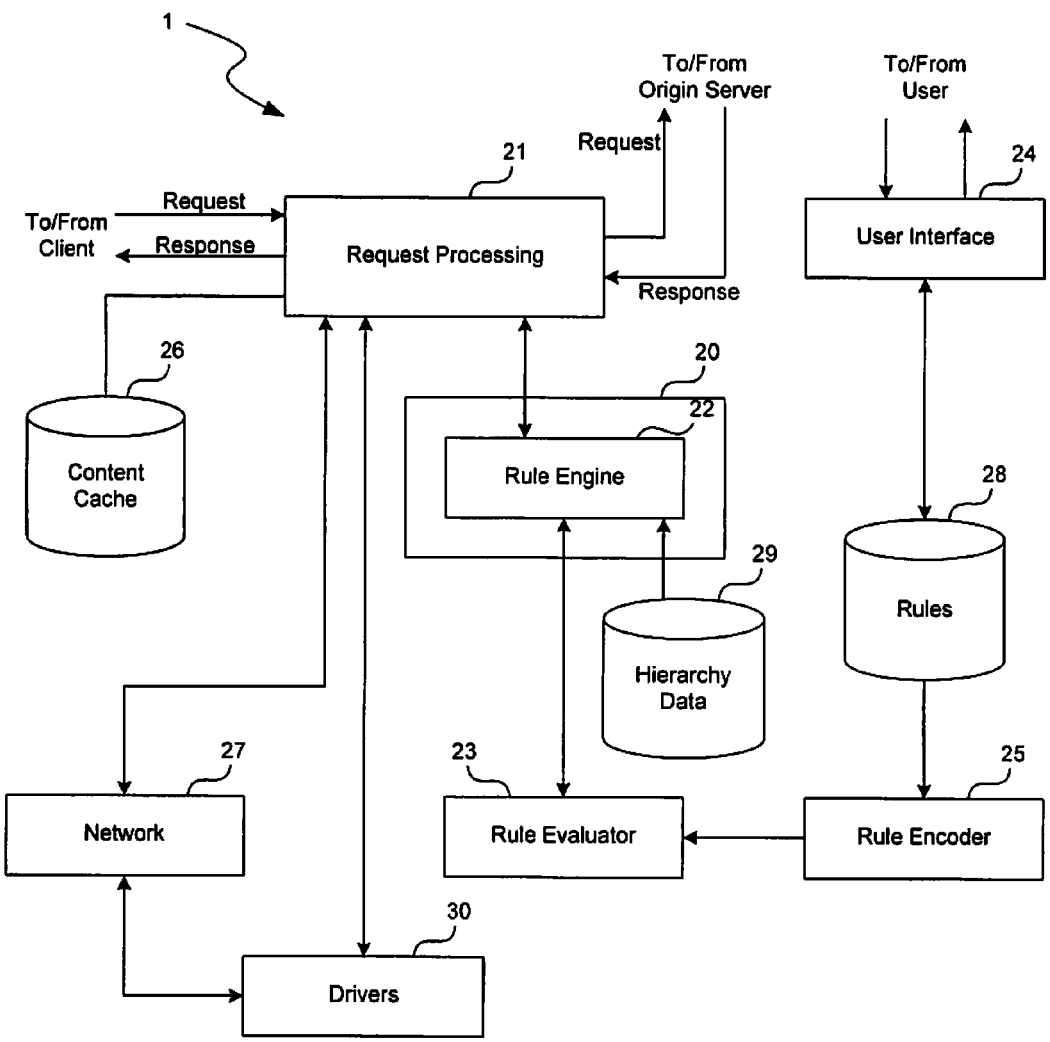
FIG. 2 illustrates a block diagram of the components of the proxy cache, according to one embodiment.

FIG. 2 illustrates a block diagram of the components of the proxy cache 1, according to one embodiment. The proxy cache 1 includes a cache hierarchy unit 20, a request processing unit 21, a rule engine 22, the rule evaluator 23, a user interface 24, a rule encoder/decoder 25, a network unit 27, and hardware drivers 30. Note that each of these elements can be embodied in either hardware, software, or a combination thereof. For example, each of these modules could be embodied as one or more hardwired integrated circuit (IC) devices, such as application specific integrated circuits (ASICs), gate arrays, programmable logic devices (PLDs), or the like. To facilitate description, however, it is henceforth assumed in this description that these elements are software modules that are executed by a programmable microprocessor or controller within the proxy cache 1.

In addition to the foregoing modules, the proxy cache also includes a content cache 26, a rules database 28 containing forwarding rules, and a database 29 of cache hierarchy data identifying the structure of and hosts in the cache hierarchy and indications of the availability (status) of such hosts.

In one embodiment, the request processing unit 21 is layer 7 (application layer) software. The request processing unit 21 is responsible for receiving content requests from clients, determining whether requested content is cached locally in the content cache 26, and forwarding the requests to appropriate destinations when the requested content is not in the content cache 26 (cache misses). In addition, request processing unit 21 may also be responsible for receiving responses to requests from origin servers and forwarding the responses to the appropriate clients.

The request processing unit 21 interfaces with network unit 27 and drivers 30. In one embodiment, network unit 27 is conventional network layer (ISO/OSI level 3) software that enables the proxy cache to communicate and other devices (e.g., clients, origin servers, and other caches). In one embodiment, drivers 30 are conventional software for driving hardware for referral devices of the proxy cache, such as disk drives, input/output (I/O) devices, etc. Note that FIG. 2 does not show all of the layers of the software stack of the proxy cache 1 (assuming a software based embodiment); however, any layers not illustrated are not germane to the present invention and are well-within the capabilities of those skilled in the art given this description.

The rule evaluator 23 is invoked by the rule engine 22 and is responsible for evaluating forwarding rules 28 in response to a request, to determine whether any of the forwarding rules applies to the request. The rule evaluator 23 accomplishes this task by determining whether all of the conditions in the rule are satisfied. A condition in a rule may be a function of a variable, such as client IP address, so that the condition is satisfied when the argument of the condition equals or matches the value of the variable in the request. When a rule is found to apply, the rule evaluator 23 indicates to the rule engine 22 any hosts (forwarding destinations) encoded in that rule. The rule evaluator 23 does this by returning a pointer to the cache hierarchy data 29 which encodes the destination(s), and which allows the rule engine 22 to utilize additional information once an action triggers.

The cache hierarchy unit 20 maintains knowledge of the cache hierarchy, as indicated by the hierarchy data 29. The cache hierarchy unit is responsible for determining the availability (status) of forwarding destinations (e.g., hosts) in the cache hierarchy, selecting an available forwarding destination encoded in a forwarding rule, and indicating the selected forwarding destinations to the request processing unit 21.

The rule engine 22 is a subset of the cache hierarchy unit 20 and is primarily responsible for invoking the rule evaluator 23 when necessary. A key aspect of the rule engine 22 is that it can cause rule evaluation to be resumed even after an action triggered, as described further below. In addition, each rule can be associated with arbitrary data structures, and thus, can be independent of the cache hierarchy data.

The user interface 24 allows the user (e.g., network administrator) to create, modify, and delete forwarding rules, so that the user can take explicit control over how the proxy cache 1 forwards requests. The user interface may be a graphical user interface (GUI), a command line interface, or any other suitable type of user interface. The user interface 24 may be accessed by the user using a separate PC connected to the proxy cache 1 via a network (e.g., via the LAN 2) or via a direct connection. In alternative embodiments, the proxy cache 1 may provide its own I/O devices sufficient to generate a user interface display directly to the user. If the user interface is a GUI, it may be presented to the user in the form of a web page, for example. Users specify rules generally in an if-condition-action format, e.g., "if client-ip=10.53/16 send single-host A". Each rule is referenced by name and encodes when and where a particular set of destinations should be forwarded requests. By permitting a rule to be disabled, a forwarding scheme may be temporarily altered while preserving the rule contents.

Figure 3A:
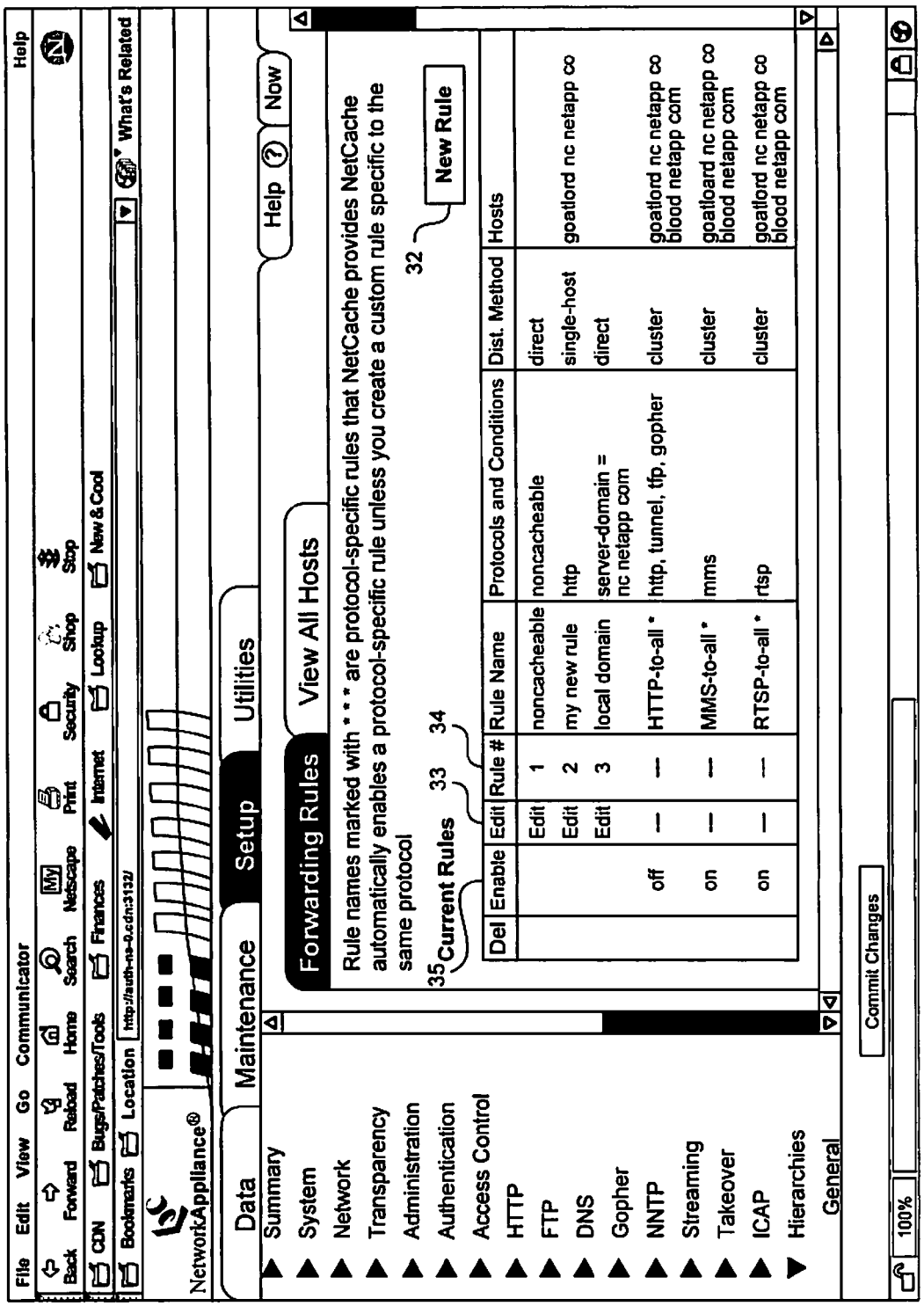
FIG. 3 shows examples of display screens which may be generated by the user interface to allow a user to specify forwarding rules.
Figure 3B:
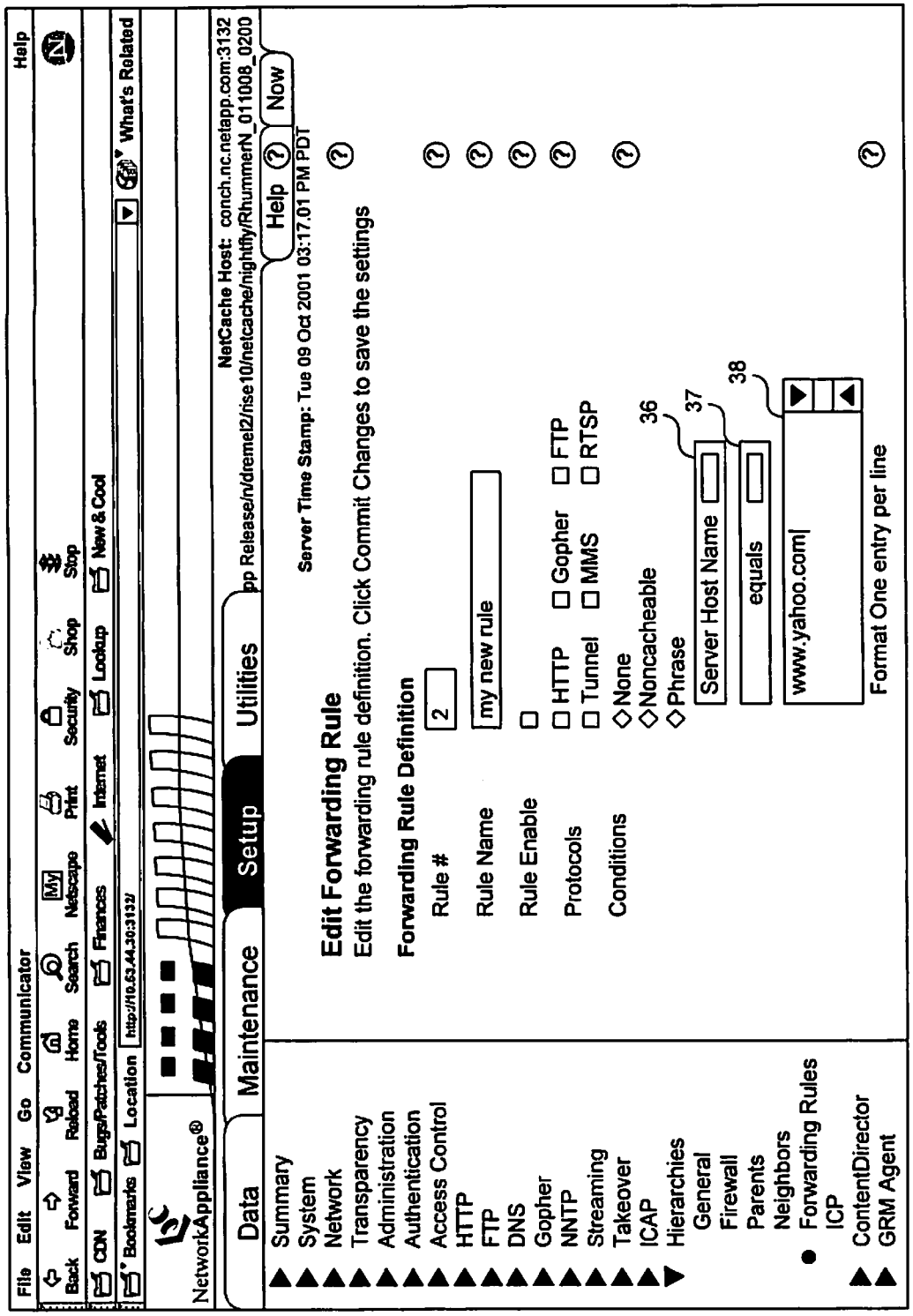
Figure 3C:
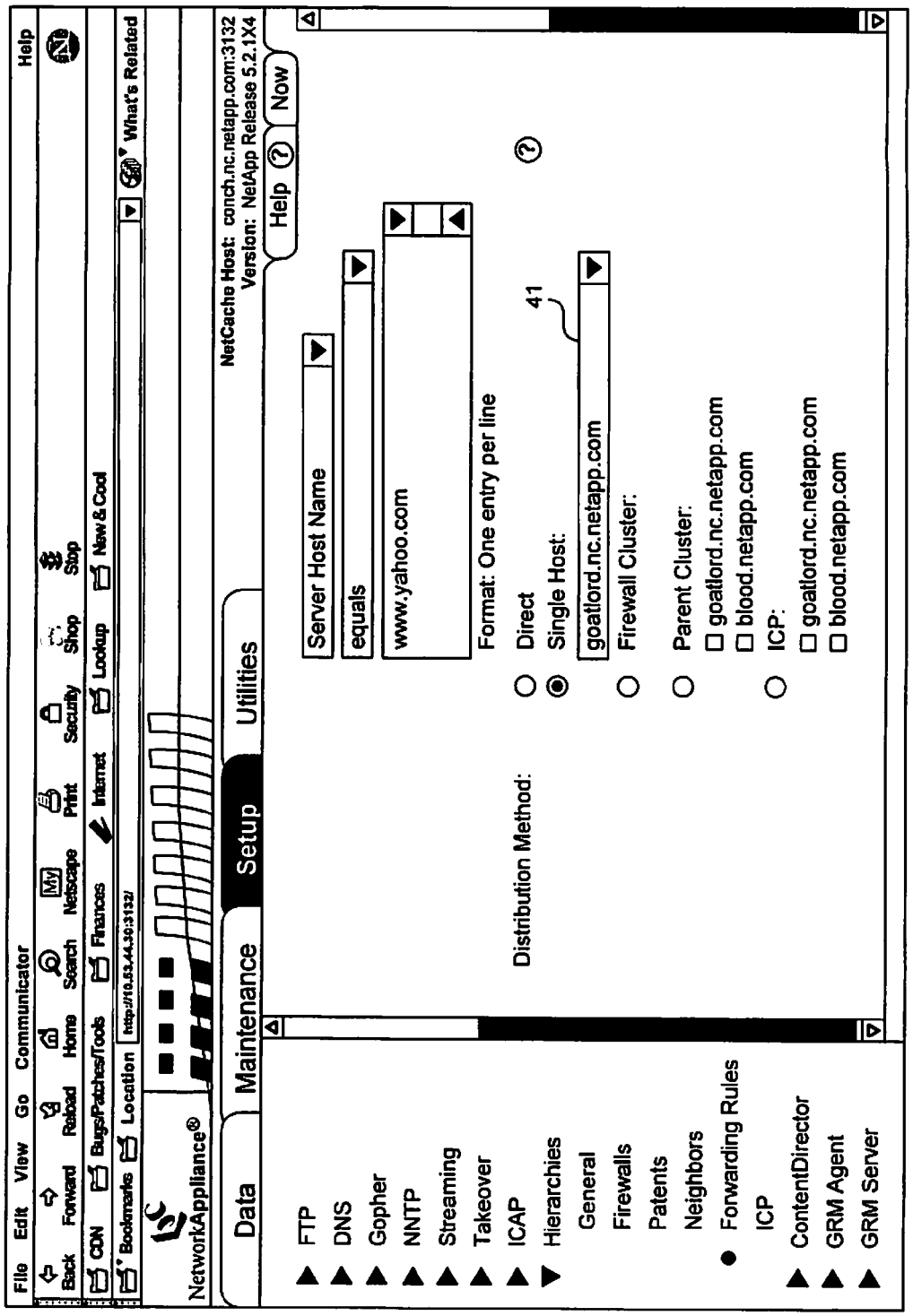

FIGS. 3A, 3B and 3C show examples of two web pages that may be generated by the user interface 24 to allow a user to add, modify or delete forwarding rules, using a mouse, keyboard and/or or other conventional input device(s). Specifically, FIG. 3A shows a display screen displaying a set of currently specified forwarding rules. Each rule is represented by a separate line in the "Current Rules" table. The "Rule #" indicates the sequence in which the rule will be evaluated when a request is received. To enable or disable an existing rule, the user checks or unchecks, respectively, the "Enable" checkbox 35 of the appropriate rule.

The proxy cache may be configured with one or more default forwarding rules, stored in rules database 28. The user may use the user interface 24 to selectively disable any default rules and, if desired, to specify new rules to be used instead. An example of this is shown in FIG. 3A, in which the last three rules, "HTTP-to-all", "MMS-to-all" and "RTSP-to-all" are default rules; however, the rule "HTTP-to-all" has been disabled by the user, to be replaced by the user-specified rule named "my new rule".

To create a new rule, the user may to click on the "New Rule" button 32. To edit an existing rule, the user may click in the "Edit" column 33 of the rule the user wishes to edit. This action causes the display screen of FIGS. 3B and 3C to be displayed, which is an example of a screen for editing a rule (FIG. 3C shows a continuation of the screen of FIG. 3B). As shown, the user can specify or alter the sequence in which the rule is evaluated (relative to the other rules) in response to a request by editing the value in the "Rule #" box. Also as shown, the user can create or change the rule name, check or uncheck the "Rule Enable" checkbox to specify whether the rule is enabled or disabled; check one or more of the "Protocols" check boxes to specifying the protocols to which the rule will apply. In addition, the user can optionally specify a condition under which the rule will be executed. The user can check the "None" checkbox to specify that the rule is unconditional or the "Non-cacheable" checkbox to specify the condition that the request is non-cacheable. Alternatively the user may wish to create a customized condition, such as "Server Host Name equals 'www.yahoo.com'" to define when the rule is to be applied. To create a custom condition, the user checks the "Phrase" checkbox, selects one of the options in pull down menu 36 (e.g., "Server Host Name", "Server IP Address", "Server Domain", "Server Port", "Client IP Address, "Cache IP Address", "Cache Port", "Beginning of URL", "URL"); then selects one of the options in pull down menu 37 (e.g., "equals", "does not equal", or "matches"); and then, enters the appropriate argument (e.g., "www.yahoo.com") in field 38.

Referring now to FIG. 3C, which shows a continuation of the Edit Forwarding Rule screen of FIG. 3B, the user may specify in the rule the distribution method for the request. One option is to specify that the request be sent directly. An alternative is that the user can specify "Single Host" and select from pull-down menu 41 one of a set of hosts previously defined in the cache hierarchy. The set of selectable hosts is stored in the cache hierarchy data 29. Alternatively, the user can specify a previously defined firewall cluster, parent cluster or Internet Cache Protocol (ICP) (RFCs 2186 and 2187).

In one embodiment the user interface 24 converts user inputs specifying rules into a syntax that has the following format:

"<rulename>" {on | off} if [<protocol>] [and [condition] [{= | !=| "matches"}] [<argument>]] send <dist_method> where:

elements that appear in brackets "[ ]" are optional;

the symbol "|" between two terms indicates the terms are alternatives;

the symbol "!=" represents "not equal to";

<rulename> is the distribution rule name;

{on | off} indicates whether the rule is enabled or disabled.

<protocol> is the protocol(s) to which the rule applies (valid inputs may be, for example: "http", "tunnel", "ftp", "gopher", "rtsp", "mms", or "none");

[<conditions>]=additional conditions under which rule applies (conditions can be omitted (unconditional), non-cacheable, or associated with characteristics embedded in the request, such that valid inputs may be, for example, none, "noncacheable" or "acl rules");

<dist_method> is the method and the target of request forwarding (valid inputs may be, for example, "direct" or "single-host <host>" or "icp <hostlist>" or "cluster <hostlist>").

Forwarding rules (both user-specified rules and default rules) are stored in rules database 28. At run-time, or in response to a configuration change, the rule encoder/decoder 25 converts the stored rules 28 into a format that is understandable by the rule evaluator 23 and capable of supporting complex statements. Each rule is encoded to include one or more forwarding destinations and communications methods. In one embodiment, a rule encoded by the rule encoder/decoder 25 and stored in rules database 28 has the following format:

<action> <distribution method>[<list of destinations>] [<protocols>] [and] [<condition variable >] [argument]

Brackets "[ ]" enclose items that are optional. Note, however, that essentially any convenient format can be used. To enable the user to view and edit previously defined rules, the rule encoder/decoder 25 also decodes rules stored in database 28 into a format usable by the user interface 24 to a display the rules to the user for editing.

In proxy caches of the known prior art, there is no provision for resuming evaluation of rules after an action has been taken or for extending a rule by associating it with an external data structure. In contrast, the rule engine 22 of proxy cache 1 includes the ability to resume rule evaluation even after an action is taken, thus providing a dynamic component to what was previously a static process. The rule evaluator 23 also returns a pointer to the cache hierarchy data 29, as noted, so that the cache hierarchy unit 20 may utilize additional information once an action triggers. The cache hierarchy unit 20 may examine other information external to the rule evaluator 23, such as host availability data in the hierarchy data 29, and the rule engine 22 can subsequently call back into the rule evaluator 23 to resume evaluation.

The rule evaluator 23 evaluates rules sequentially, and the effect of rules may be altered by the user at any time by re-arranging their order. When a request containing a matching protocol and/or conditions triggers execution of a rule, the cache hierarchy unit 20 determines whether it believes the destinations encoded by the rule are indeed available. The cache hierarchy unit 20 makes this determination based on status information on each of the hosts of which it has knowledge in the cache hierarchy data 29. If no destination encoded by the rule is available, the rule engine 22 causes rule evaluation to be immediately resumed. Otherwise, an available destination is chosen by the cache hierarchy unit 20 (based on the distribution method) and returned to the request processing unit 21, which then attempts to make a protocol-specific connection to that destination. If the request processing unit 21 is unable to establish a connection with the destination, it asks the cache hierarchy unit 20 to make another choice of destination. This action also can trigger resumption of the rule evaluation process.

The ability to resume rule evaluation permits the creation of well defined failover strategies specifying primary and secondary paths for traffic. The following two rules provide an example of such a failover strategy:

if client-ip=10.53/16 send single-host A
if client-ip=10.53/16 send single-host B According to the above two rules, when a request originates on a specific subnet (10.53/16), then it should always be routed to host "A". This routing may be used for a variety of reasons, such as authentication, content filtering, or bandwidth provisions. However if host "A" is unavailable, then host "B" can serve as a standby backup destination, so that the request can proceed uninterrupted. Re-ordering these rules would reverse the notion of primary and backup with respect to host A and host B.

Complex conditions can also be created by the user, since the effect of the rules is cumulative. For example, assume that a user desires that any requests not destined for servers X, Y or Z be forwarded to host "A". However, if the requests are destined for X, Y or Z and originate from the client network 10.53/16, the user wants the requests to be forwarded to host "A". On the other hand, if the destination is X, Y or Z and the client network is 10.34/16, then the user wants the request to be sent directly. This forwarding scheme may be specified by the user (via user interface 24) as follows:

if server-name !=X Y Z send single-host A
if client-ip=10.53/16 send single-host A
if client-ip=10.34/16 send direct In one embodiment, rather than complicating the programming syntax by introducing multiple condition variables for each statement, a simple, single-condition syntax is used to achieve the same effect. Since the rule evaluator 23 is responsible for the condition variable definition, the rule engine 22 is not modified when new variables are introduced. This approach makes it very easy to add new functionality (e.g., new rules) while guaranteeing that previously working software (assuming a software based embodiment) in the proxy cache 1 will not experience any unintended side effects.

Figure 4A:
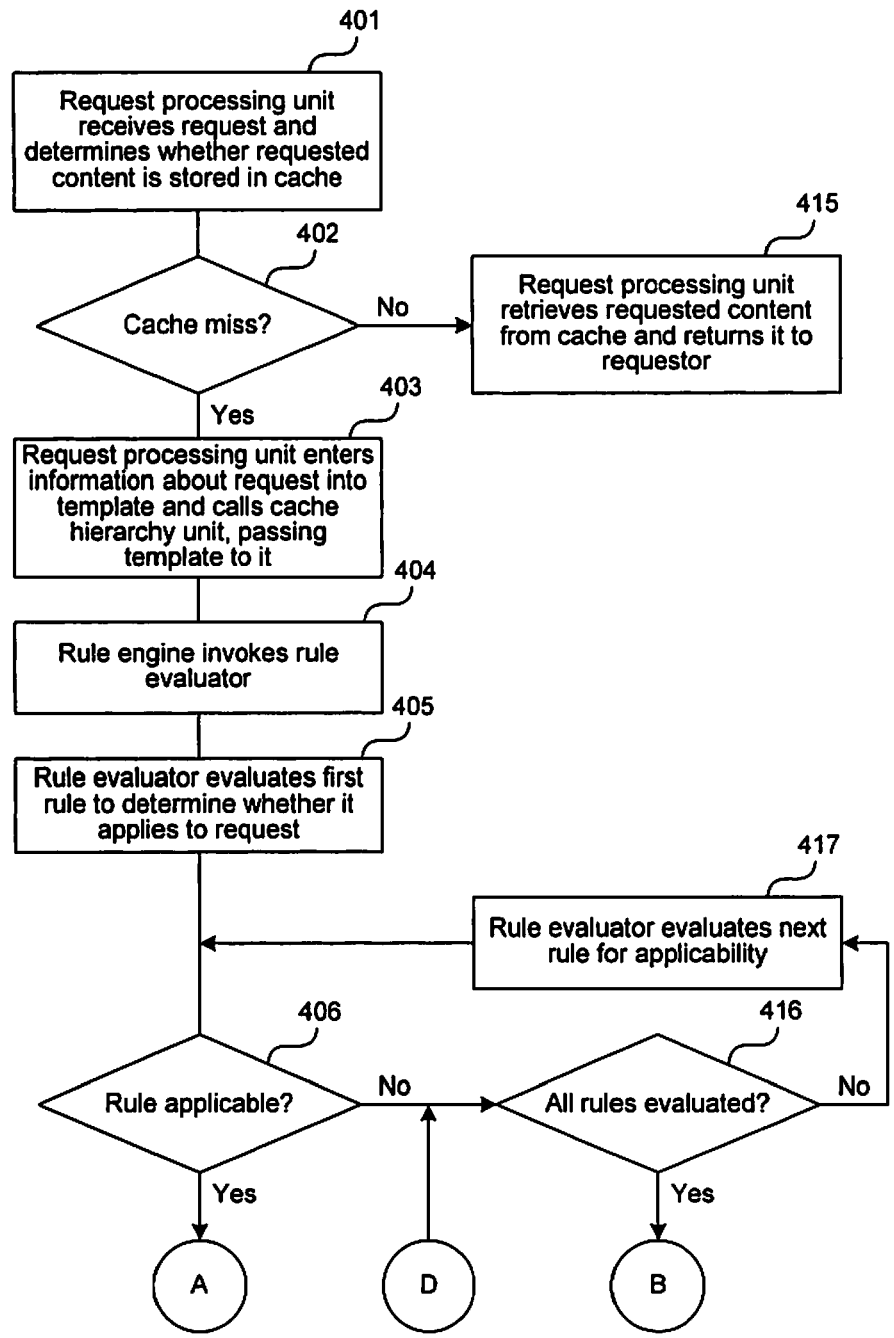
FIG. 4 is a flow diagram showing a request forwarding process that may be executed in the proxy cache, according to one embodiment.
Figure 4B:
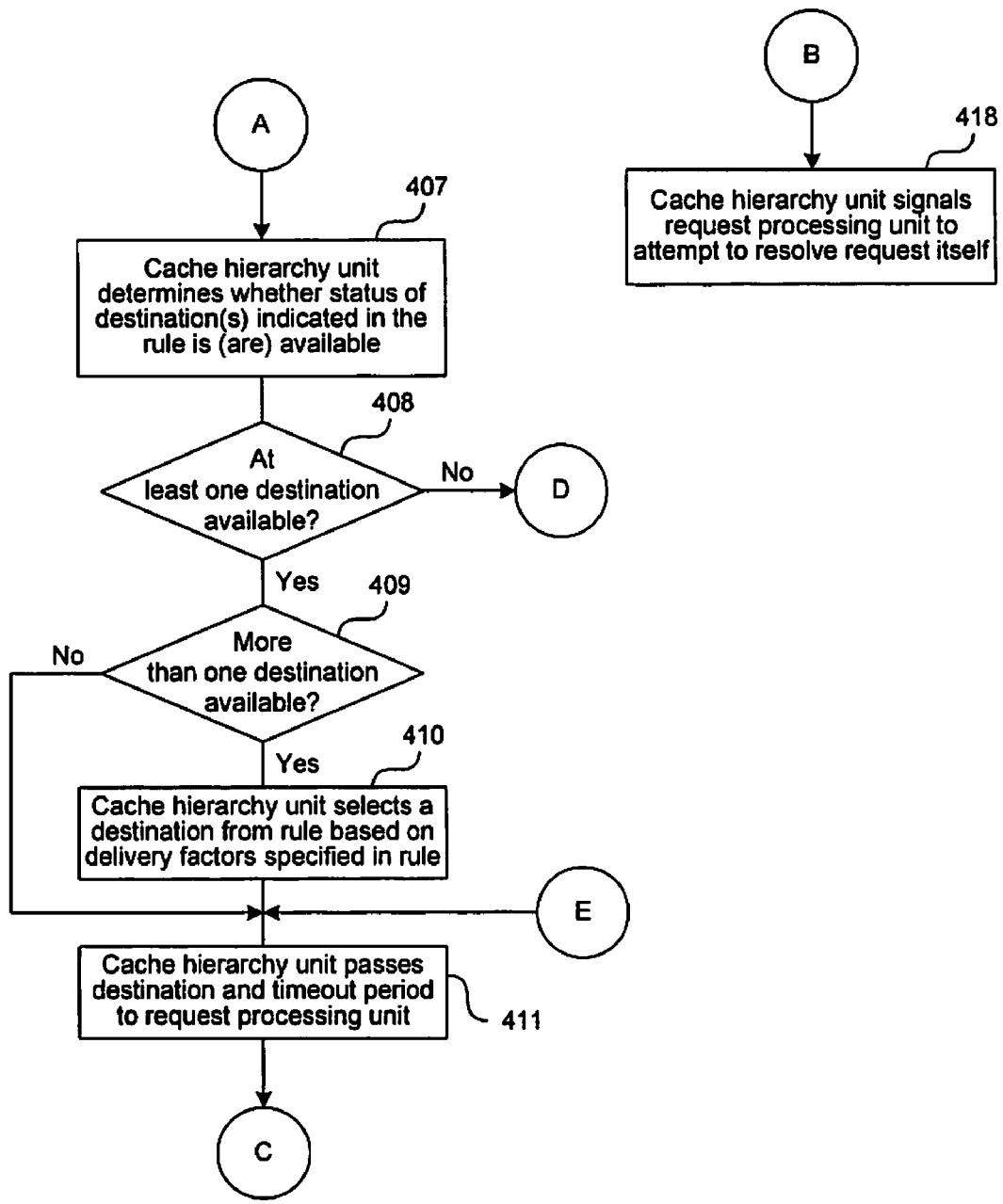
Figure 4C:
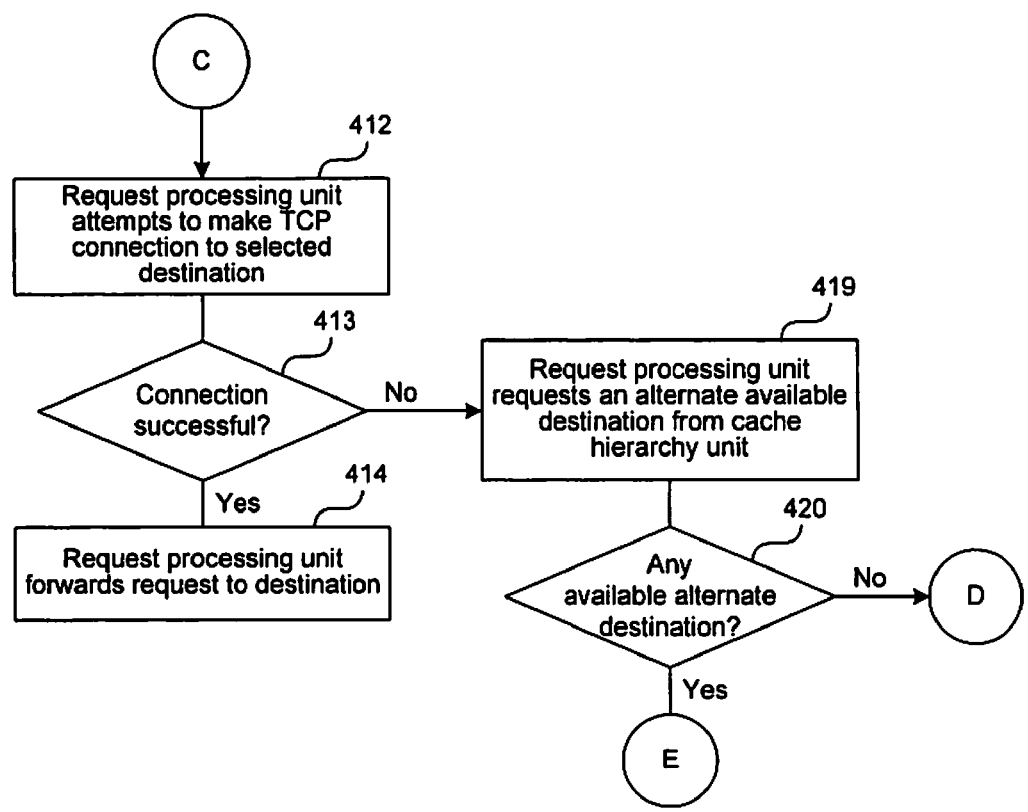

FIGS. 4A, 4B and 4C collectively form a flow diagram of a request forwarding process that may be executed in the proxy cache 1, according to one embodiment of the present invention. Initially, at block 401 the request processing unit 21 receives a content request from a client and determines whether the requested content is stored in the local cache 26. If the requested content is determined to be in the cache 26 (no cache miss) (block 402), the process ends with block 415, in which the request processing unit 21 retrieves the requested content from the cache 26 and sends the requested content to the requesting client. Of course, before doing so the request processing unit 21 may first apply other conditions or perform other appropriate operations, such as any required AAA and/or determining whether the cached content is still "fresh".

In the event of a cache miss, however, the process continues from block 403, in which the request processing unit 21 enters information about the request into a data template and then calls the cache hierarchy unit 20, passing to it the filled-in template. The template may have any convenient format and includes various information associated with the request, such as the client IP address, destination server name, uniform resource locator (URL) of the requested content, source port, destination port, protocol, and whether the request is cacheable. In response to receiving the template, the rule engine 22 invokes the rule evaluator 23 at block 404. Next, at block 405 the rule evaluator 23 evaluates the first rule (as indicated by the user-specified "Rule #") in the rules database 28 that is enabled, to determine whether the rule applies to (should be executed) the request, i.e., the condition in the rule is satisfied (or the rule is unconditional) and the protocol specified in the rule matches that of the request. If the rule being evaluated applies to the request (block 406), the process continues from block 407. Otherwise, the process continues from block 416. At block 416, if all rules have been evaluated for this request, the process ends with block 418, in which the cache hierarchy unit 20 signals the request processing unit 21 to attempt to resolve the request itself. If all rules have not yet been evaluated for this request, however, then the process continues from block 417, in which the rule evaluator 23 evaluates the next rule for applicability to the request, followed by block 406 as described above.

In block 407 (after the rule is found to be applicable to a request), the cache hierarchy unit 20 determines whether the forwarding destination or destinations specified in the rule are available, based on the host status information in the cache hierarchy data 29. If at least one such destination is available (block 408), the process continues from block 409. Otherwise, the process continues from blocks from 416 and 417 (sequential evaluation of the next enabled rule, if any), as described above. If more than one destination is determined to be available in block 409, then at block 410 the cache hierarchy unit 20 selects one of the available destinations in the rule based on delivery factors specified in the rule.

The delivery factors specified in a rule that are used by the cache hierarchy unit 20 to select a destination include at least the specified distribution method (e.g., direct, single-host, etc.). Other examples of possible delivery factors that can be used to select the destination are link bandwidth, destination load, and destination weighting. Link bandwidth may be a measure of the bandwidth which can be supported by a link between the proxy cache 1 and a particular destination. Destination load may be, for example, an indication of whether the current load on a selectable destination exceeds a threshold load value for that destination. This information may be part of the availability data stored in the cache hierarchy data 29 and updated as part of an ongoing process. Destination weighting may be an indication of how the forwarding of requests should be distributed between two or more selectable destinations encoded in a rule. For example, one destination encoded in a rule might be weighted to receive 80 percent of all forwarded requests, while a second destination encoded in the rule is encoded to receive 20 percent of all forwarded requests. Of course, use of the destination weighting may be made subject to other factors, such as the destination load.

Following block 409, the process continues from block 410. If only one destination from the rule was available, then the process bypasses block 410 and continues from block 411.

At block 411, the cache hierarchy unit 20 passes to the request processing unit 21 the destination and a connection timeout period. The timeout period will be used by the request processing unit 21 in attempting to make a connection with the selected destination. The timeout period may be computed by the cache hierarchy unit 20 on a per request basis and may be tailored for the destination selected for the request. For example, part of the availability data in the cache hierarchy data 29 may be information on the response time and/or loading of each host in the cache hierarchy. This information may be obtained by the cache hierarchy unit 20 as part of an ongoing background process of maintaining current status information on all of the hosts in the cache hierarchy. One way in which the expected response time of a host can be determined is to establish a TCP connection with that host from time to time (not necessarily in response to any content request) to determine the amount of time required to complete the connection. Hence, the cache hierarchy unit 20 may compute the timeout period for the selected destination based on the expected response time and/or other data relating to that host.

Next, at block 412 the request processing unit 21 attempts to make a transfer control protocol (TCP) connection to the selected destination, using the timeout period provided by the cache hierarchy unit 20. If the connection attempt is successful (block 413), the process ends with the request processing unit 21 forwarding the request to the destination at block 414. If the connection attempt was not successful, the process continues from block 419, in which the request processing unit 21 requests an alternate available destination from the cache hierarchy unit 20. At block 420, if there is another destination encoded in the rule which was determined to be available, then the process loops back to block 411, as described above. If no alternate destination is available, the process loops back to blocks 416 and 417, as described above.

Figure 5:
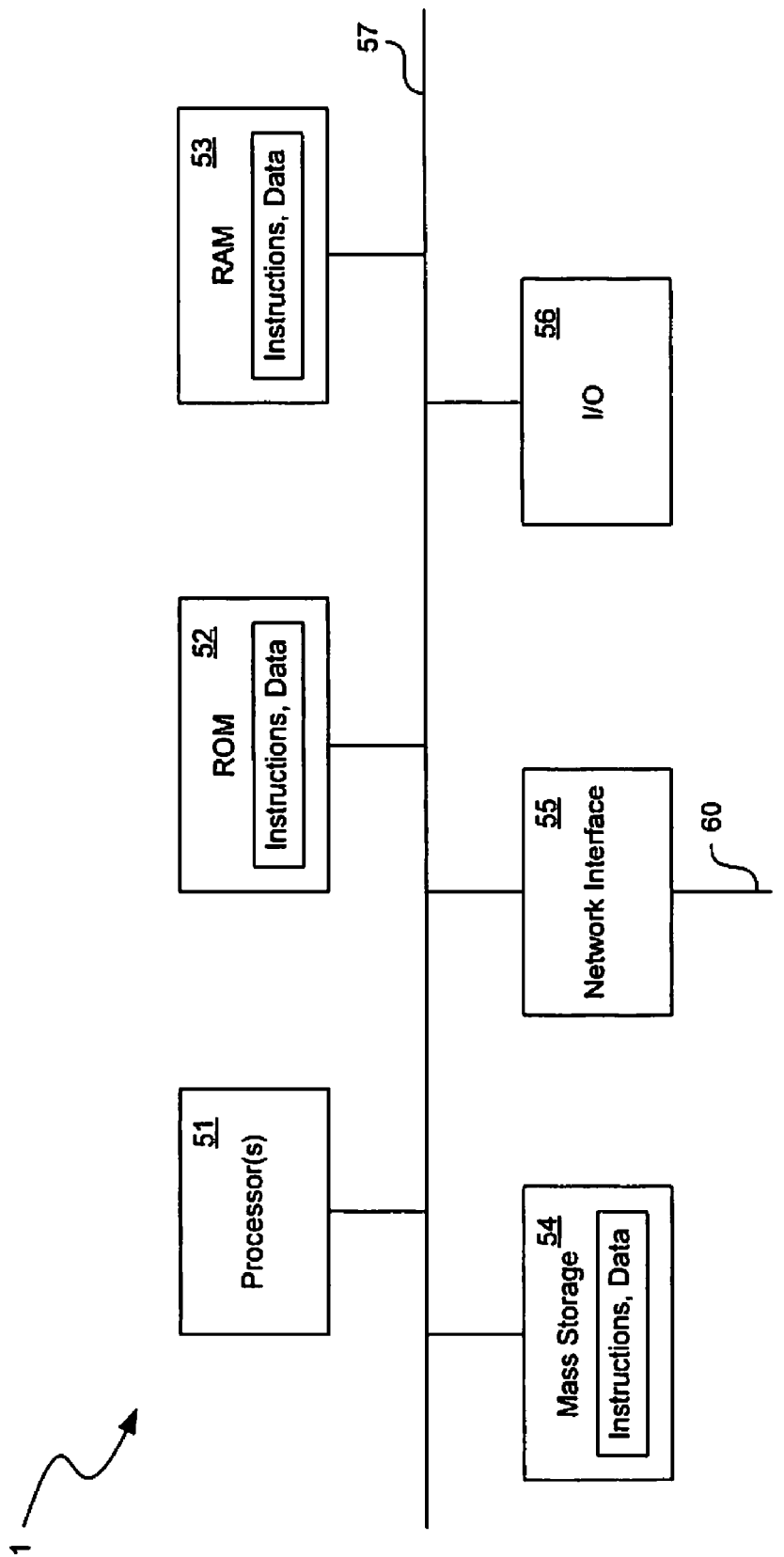
FIG. 5 is block diagram showing an abstraction of the hardware components of the proxy cache, according to one embodiment.

FIG. 5 is a block diagram showing an abstraction of the hardware components of the proxy cache 1. Note that there are many possible implementations represented by this abstraction, which will be readily appreciated by those skilled in the art given this description.

The illustrated system includes one or more processors 51, i.e. a central processing unit (CPU), read-only memory (ROM) 52, and random access memory (RAM) 53, which may be coupled to each other by a bus system 57 and/or by direct connections. The processor(s) 51 may be, or may include, one or more programmable general-purpose or special-purpose microprocessors, digital signal processors (DSPs), programmable controllers, application specific integrated circuits (ASICs), programmable logic devices (PLDs), or a combination of such devices. The bus system (if any) 57 includes one or more buses or other connections, which may be connected to each other through various bridges, controllers and/or adapters, such as are well-known in the art. For example, the bus system 57 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 57 are one or more mass storage devices 54, a network interface 55, and one or more input/output (I/O) devices 56. Each mass storage device 54 may be, or may include, any one or more devices suitable for storing large volumes of data in a non-volatile manner, such as a magnetic disk or tape, magneto-optical (MO) storage device, or any of various forms of Digital Versatile Disk (DVD) or CD-ROM based storage, or a combination thereof. RAM 53 and/or the mass storage device(s) 54 may be used to implement the content cache 26 (FIG. 2).

The network interface 55 is one or more data communication devices suitable for enabling the processing system to communicate data with remote devices and systems via an external communication link 60. Each such data communication device may be, for example, an Ethernet adapter, a Digital Subscriber Line (DSL) modem, a cable modem, an Integrated Services Digital Network (ISDN) adapter, a satellite transceiver, or the like. Referring again to the embodiment of FIG. 1, the network interface 55 is used by the proxy cache 1 to communicate both over the LAN 2 and over the Internet 3. In particular, the network interface 55 is the communications interface by which the proxy cache 1 receives and communicates requests and responses between clients and servers. In addition, the network interface 55 may also be the communications interface by which a user adds, modifies, or deletes forwarding rules used by the proxy cache 1. Note that while only one external communication link 60 is illustrated, separate physical communication links may be provided for each network connection (e.g., to LAN 2, Internet 3), although that is not necessarily the case.

Since proxy cache 1 may be accessed by a user via network interface 55, proxy cache 1 does not necessarily require its own I/O devices 56. Nonetheless, such I/O devices may be included in some embodiments and may include, for example, a keyboard or keypad, a display device, and a pointing device (e.g., a mouse, trackball, or touchpad).

As noted, the above-described processes and techniques (e.g., request processing, rule definition, rule evaluation, etc.) may be implemented at least partially in software. Such software may be part of the operating system of the proxy cache 1. Such software may reside, either entirely or in part, in any of RAM 53, mass storage device(s) 54 and/or ROM 52. Such software may be executed by the processor(s) 51 to carry out the described processes and techniques.

Thus, a method and apparatus for forwarding requests in a cache hierarchy based on user-defined forwarding rules have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A caching device to operate as an intermediary node on a network, the device comprising: a cache to store content requestable by a client on the network; a user interface to enable a user to specify a set of forwarding rules for forwarding requests on the network; a database to store the set of forwarding rules; a request processing unit to receive a request from the client; a rule evaluator to evaluate the set of forwarding rules to identify within the set of forwarding rules a rule which applies to the request, such that the request processing unit attempts to forward the request to a destination selected according to said rule, wherein the rule indicates a host in a defined forwarding hierarchy; and a rule engine to determine an availability of the host indicated in said rule and, when the host is available, to select the host as a forwarding destination and to cause the request processing unit to forward the request to the host according to said rule, wherein the request processing unit is further to use a timeout period in attempting to establish a connection with the forwarding destination, the timeout period based on information indicative of a responsiveness of the forwarding destination, wherein the information indicative of the responsiveness of the forwarding destination comprises information indicative of a loading on, or a response time of, the forwarding destination, and wherein the timeout period is computed in response to the request being received, wherein, when the request processor is unable to forward the request according to said rule, the rule evaluator resumes evaluating the set of forwarding rules to identify another rule corresponding to the request.

2. A device as recited in claim 1, wherein the user may specify one or more of the forwarding rules to indicate a manner of forwarding the request within the forwarding hierarchy.

3. A device as recited in claim 1, wherein the forwarding hierarchy is a cache hierarchy.

4. A device as recited in claim 3, further comprising a cache to store content requestable by a client on the network, wherein the request processing unit forwards the request only in the event of a cache miss, wherein the request is a request for content on the network.

5. A device as recited in claim 1, wherein the rule evaluator identifies the rule which applies to the request by determining that a condition in the rule involving a variable in the request is satisfied.

6. A device as recited in claim 1, wherein said rule comprises a plurality of destinations, and wherein the rule engine selects a destination from among the plurality of destinations as a forwarding destination for the request, based on the delivery factor included in the rule.

7. A device as recited in claim 1, wherein the delivery factor comprises a specified distribution method for the request.

8. A device as recited in claim 1, wherein the delivery factor comprises an indication of a current load.

9. A device as recited in claim 1, wherein the delivery factor comprises a weighting indicating a preferred distribution of forwarding requests.

10. A device as recited in claim 1, wherein the user interface is further to enable the user to modify the set of forwarding rules.

11. A device as recited in claim 1, wherein the user interface is further to enable the user to specify a sequence in which the rules of the set of forwarding rules are evaluated in response to the request.

12. A device as recited in claim 1, wherein the user interface is further to enable the user to selectively enable or disable a default forwarding rule.

13. A device to operate as an intermediary node on a network, the device comprising: a processor; a network interface to allow the device to communicate on the network; and a storage facility to store program code for execution by the processor to cause the device to provide a user interface to enable a user to specify a set of forwarding rules, receive a request for content from a client, determine whether the content is cached locally in said device, and in response to a determination that the content is not cached locally in the device, evaluate the set of forwarding rules to identify a rule in the set of forwarding rules which should be applied to the request, determine an availability of a host indicated in said rule and select the host as a forwarding destination for the request when the host is available, utilizing a timeout period in attempting to establish a connection with the forwarding destination, the timeout period based on information indicative of a responsiveness of the forwarding destination, wherein the information indicative of the responsiveness of the forwarding destination comprises information indicative of a loading on, or a response time of, the forwarding destination, and wherein the timeout period is computed in response to the request being received, forward the request on the network according to said rule, and resume evaluating the set of forwarding rules to identify another rule corresponding to the request when the device is unable to forward the request according to said rule.

14. A device as recited in claim 13, wherein the device operates within a defined forwarding hierarchy, and the user may specify one or more of the forwarding rules to indicate a manner of forwarding the request within the forwarding hierarchy.

15. A device as recited in claim 14, wherein the forwarding hierarchy is a cache hierarchy.

16. A device as recited in claim 15, further comprising a cache to store content requestable by a client on the network, wherein the device forwards the request only in the event of a cache miss at the device.

17. A device as recited in claim 13, wherein the request is a request for content on the network.

18. A device as recited in claim 13, wherein the program code is further to cause the device, when executed by the processor, to identify the rule which should be applied in response to the request by identifying a correspondence between a variable in the request and a variable in the rule.

19. A device as recited in claim 13, wherein the user interface is further to enable the user to modify the set of forwarding rules.

20. An intermediary network node comprising: means for receiving a request for content on a network; means for determining a forwarding destination for the request in a defined forwarding hierarchy, by applying a set of user-specified forwarding rules to the request; means for determining an availability of a host indicated in said rule and selecting the host as a forwarding destination for the request when the host is available, wherein the means for receiving the request is further to use a timeout period in attempting to establish a connection with the forwarding destination, the timeout period based on information indicative of a responsiveness of the forwarding destination, wherein the information indicative of the responsiveness of the forwarding destination comprises information indicative of a loading on, or a response time of, the forwarding destination, and wherein the timeout period is computed in response to the request being received; means for forwarding the request according to the determined forwarding destination; and means for resuming evaluation of the set of forwarding rules to identify another rule corresponding to the request when said forwarding the request is unsuccessful.

21. An intermediary network node as recited in claim 20, wherein the forwarding hierarchy is a cache hierarchy.

22. An intermediary network node as recited in claim 21, wherein the intermediary node is a network caching device, and wherein said determining and said forwarding are performed only if the request results in a cache miss at the intermediary network node.

23. A caching device to operate within a cache hierarchy on a network, the caching device comprising: a cache to store content requestable by a client on the network; a request processing unit to receive a request for content from the client, and to forward the request on the network based on a set of forwarding rules in the event of a cache miss; a user interface to enable a user to specify the set of forwarding rules, such that the user may specify one or more forwarding rules to indicate a host in the cache hierarchy as a destination for a corresponding request; a database to store the set of forwarding rules; a rule evaluator to evaluate the set of forwarding rules in response to the cache miss, to identify a rule in the set of forwarding rules which applies to the request; and a rule engine to determine an availability of a host indicated in the rule, and to select the host as a forwarding destination for the request when the host is available, wherein the request processing unit is further to use a timeout period in attempting to establish a connection with the forwarding destination, the timeout period based on information indicative of a responsiveness of the forwarding destination, wherein the information indicative of the responsiveness of the forwarding destination comprises information indicative of a loading on, or a response time of, the forwarding destination, and wherein the timeout period is computed in response to the request being received, the rule engine further to indicate to the request processing unit when the host is available to cause the request processing unit to forward the request to the host, wherein, when the request processing unit is unable to forward the request according to said rule, the rule evaluator resumes evaluating the set of forwarding rules to identify another rule corresponding to the request.

24. An intermediary network node as recited in claim 23, wherein the rule evaluator identifies the rule which applies to the request by determining that a condition in the rule is satisfied.

25. An intermediary network node as recited in claim 24, wherein the condition involves a variable in the request.

26. An intermediary network node as recited in claim 23, wherein said rule comprises a plurality of destinations, and wherein the rule engine selects said destination from among the plurality of destinations, based on the availability of each of the plurality of destinations.

27. An intermediary network node as recited in claim 23, wherein the user interface is further to enable the user to modify the set of forwarding rules.

28. An intermediary network node as recited in claim 23, further comprising a rule encoder to encode into a uniform syntax forwarding rules specified by the user.

29. A network caching device to operate within a defined cache hierarchy on a network, the caching device comprising: a cache to store content from an origin server on the network; an application to receive a request for content from a client via the network, and to forward the request on the network based on a set of forwarding rules in the event of a cache miss; a user interface to enable a user to specify and modify the set of forwarding rules; a rule encoder to encode into a uniform syntax forwarding rules specified by the user; a rules database to store the encoded forwarding rules; a rule evaluator to evaluate the set of forwarding rules sequentially in response to the cache miss, to identify a rule in the set of forwarding rules which applies to the request, by identifying a correspondence between a variable in the request and a variable in the rule, the rule specifying a host within the cache hierarchy as a forwarding destination for the request; and a rule engine to determine an availability of the host and to select the host as said forwarding destination for the request when the host is available, the rule engine further to indicate the host to the application layer when the host is available, wherein the application is further to use a timeout period in attempting to establish a connection with the forwarding destination, the timeout period based on information indicative of a responsiveness of the forwarding destination, wherein the information indicative of the responsiveness of the forwarding destination comprises information indicative of a loading on, or a response time of, the forwarding destination, and wherein the timeout period is computed in response to the request being received, such that the application layer forwards the request to the host upon successfully establishing the connection, wherein when the application layer is unable to forward the request according to the rule, the rule evaluator resumes evaluating the set of forwarding rules to identify another rule corresponding to the request.

30. A network caching device as recited in claim 29, wherein said rule comprises a plurality of destinations, and wherein the rule engine selects said destination from among the plurality of destinations, based on the availability of each of the plurality of destinations.

31. A method of operating a caching device in a cache hierarchy on a network, the method comprising: caching content on the network; providing a user interface to enable a user to specify a set of forwarding rules; storing the set of forwarding rules; receiving a request from the client; evaluating the set of forwarding rules when the request produces a cache miss, to identify a rule in the set of forwarding rules that applies to the request; determining an availability of a host indicated in the rule; attempting to establish a connection to the host when the host is available, wherein a timeout period is utilized in attempting to establish a connection with the host, the timeout period based on information indicative of a responsiveness of the host, wherein the information indicative of the responsiveness of the forwarding destination comprises information indicative of a loading on, or a response time of, the forwarding destination, and wherein the timeout period is computed in response to the request being received,; forwarding the request to the host; and resuming said evaluating to identify another rule having a correspondence to the request when said attempting to establish the connection is unsuccessful.

32. A method as recited in claim 31, further comprising, if said attempting to establish the connection is unsuccessful:

determining whether a second available host is indicated in the rule, and if so, attempting to establish a connection to the second available host; and forwarding the request to the second available host.

33. A method as recited in claim 31, wherein said providing the user interface comprises providing the user interface such that the user may specify one or more forwarding rules to indicate a host in the cache hierarchy as a destination for a corresponding request.

34. A method as recited in claim 31, wherein the rule is determined to apply to the request if a condition in the rule is satisfied by the request.

35. A method as recited in claim 34, wherein the condition is a function of a variable in the request.

36. A method as recited in claim 31, wherein said providing the user interface comprises providing the user interface to enable the user to modify the set of forwarding rules.

37. A proxy cache to operate as an intermediary node on a network, the proxy cache comprising: a user interface to enable a user to specify a set of forwarding rules for forwarding requests on the network, wherein a rule in said set of forwarding rules can specify a plurality of destinations; a database to store the set of forwarding rules; a request processing unit to receive a request at the proxy cache from a client; a rule evaluator to evaluate the set of forwarding rules to identify a rule in the set of forwarding rules which applies to the request; and a rule engine to select a destination from among the plurality of destinations based on a delivery factor included in the rule, the delivery factor comprising one of: a specified distribution method for the request, an indication of a current load on one of the plurality of destinations, or a weighting of the plurality of destinations indicating a preferred distribution of forwarding requests between the plurality of destinations, the rule engine further to cause the request processing unit to forward the request to the destination when the destination is available, wherein the request processing unit is further to use a timeout period in attempting to establish a connection with the forwarding destination, the timeout period based on information indicative of a responsiveness of the forwarding destination, wherein the information indicative of the responsiveness of the forwarding destination comprises information indicative of a loading on, or a response time of, the forwarding destination, and wherein the timeout period is computed in response to the request being received.

38. A device as recited in claim 37, wherein the proxy cache is configured to operate within a defined cache hierarchy, and the user may specify one or more of the forwarding rules to indicate a manner of forwarding the request within the cache hierarchy.

39. A device as recited in claim 37, further comprising a cache to store content requestable by a client on the network, wherein the request processing unit forwards the request only in the event of a cache miss, wherein the request is a request for content on the network.

40. A device as recited in claim 37, wherein the user interface is further to enable the user to modify the set of forwarding rules, to specify a sequence in which the forwarding rules are to be evaluated, and to selectively enable or disable a default forwarding rule.

41. A device as recited in claim 1, wherein the delivery factor comprises an indication of a link bandwidth between the request processing unit and the destinations.

42. A device as recited in claim 13, wherein the delivery factor comprises at least one of:
a specified distribution method for the request;
an indication of a current load;
a weighting indicating a preferred distribution of forwarding requests; or
an indication of a link bandwidth.

43. An intermediary node as recited in claim 20, wherein the delivery factor comprises at least one of:
a specified distribution method for the request;
an indication of a current load;
a weighting indicating a preferred distribution of forwarding requests; or
an indication of a link bandwidth.

44. A caching device as recited in claim 23, wherein the delivery factor comprises at least one of:
a specified distribution method for the request;
an indication of a current load;
a weighting indicating a preferred distribution of forwarding requests; or
an indication of a link bandwidth.

45. A network caching device as recited in claim 29, wherein the delivery factor comprises at least one of:
a specified distribution method for the request;
an indication of a current load;
a weighting indicating a preferred distribution of forwarding requests; or
an indication of a link bandwidth.

46. A method as recited in claim 31, wherein the delivery factor comprises at least one of:
a specified distribution method for the request;
an indication of a current load;
a weighting indicating a preferred distribution of forwarding requests; or
an indication of a link bandwidth.

* * * * *